(12) United States Patent
Yamaguchi et al.

(10) Patent No.: US 8,596,715 B2
(45) Date of Patent: Dec. 3, 2013

(54) HEADREST DEVICE

(75) Inventors: Hiroyoshi Yamaguchi, Yokohama (JP);
Kenzou Yasuda, Yokohama (JP);
Makoto Hasegawa, Yokohama (JP);
Takeshi Ito, Yokohama (JP); Eiji Shimizu, Yokohama (JP); Satoshi Nishikido, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 168 days.

(21) Appl. No.: 13/071,089

(22) Filed: Mar. 24, 2011

(65) Prior Publication Data
US 2011/0233974 A1 Sep. 29, 2011

(30) Foreign Application Priority Data
Mar. 29, 2010 (JP) ................................. 2010-075933

(51) Int. Cl.
*B60N 2/42* (2006.01)
(52) U.S. Cl.
USPC ........................................ 297/216.1; 297/391
(58) Field of Classification Search
USPC ...................................... 297/216.12, 408, 391
See application file for complete search history.

(56) References Cited

U.S. PATENT DOCUMENTS

| 3,929,374 A * | 12/1975 | Hogan et al. ................ 297/61 |
| 5,694,320 A * | 12/1997 | Breed ............................. 701/45 |
| 6,962,392 B2 * | 11/2005 | O'Connor ...................... 297/61 |
| 7,963,598 B2 * | 6/2011 | Akaike et al. ............ 297/216.12 |
| 2007/0027599 A1 * | 2/2007 | Sakai et al. ..................... 701/49 |
| 2008/0042477 A1 * | 2/2008 | Breed ....................... 297/216.12 |
| 2010/0063685 A1 * | 3/2010 | Bullinger ....................... 701/45 |
| 2010/0314918 A1 * | 12/2010 | Alexander et al. ....... 297/216.12 |

FOREIGN PATENT DOCUMENTS

JP A-2007-168751 7/2007

* cited by examiner

*Primary Examiner* — Sarah B McPartlin
(74) *Attorney, Agent, or Firm* — Oliff & Berridge, PLC (57) ABSTRACT

A headrest device comprises a headrest body which includes a headrest rear portion supported with respect to a seatback of a seat on which a passenger of a vehicle sits, and a headrest front portion that is movable within a predetermined range from a fully closed position that is closest to the headrest rear portion to a fully open position that is farthest from the headrest rear portion; a detection unit which detects a running state or an operation state of the vehicle; a prediction unit which predicts a possibility of a rear vehicle collision with the vehicle on the basis of the running state or the operation state of the vehicle detected by detection unit; and a control unit which controls, in a case in which the possibility of the rear vehicle collision is predicted by the prediction unit, movement of a position of the headrest front portion so that a backset becomes smaller than a backset at the time of the prediction, the backset being a horizontal distance between the headrest front portion and a head of the vehicle passenger.

7 Claims, 11 Drawing Sheets

HEADREST DEVICE

CROSS-REFERENCE TO RELATED APPLICATIONS

This application is based on and claims priority under 35 USC 119 from Japanese Patent Application No. 2010-075933 filed on Mar. 29, 2010.

BACKGROUND OF THE INVENTION

1. Technical Field

The present invention relates to a headrest device.

2. Related Art

Traditionally, as disclosed in Japanese Patent Application Laid-Open (JP-A) No. 2007-168751, there has been known a technology that predicts a rear collision (a collision between an own vehicle and a rear vehicle) by using radar and moves a headrest front portion toward a fully open position relative to a headrest rear portion.

SUMMARY

However, in the technology disclosed in JP-A No. 2007-168751, when the rear vehicle causing the rear collision is fast or the rear vehicle is unable to be detected by the radar or the like even when the rear vehicle is present (for example, the rear vehicle is present out of the detection range of the radar), there may be a case that the rear vehicle collides with the own vehicle, so that a head portion of a passenger is greatly moved toward the rear side of the vehicle before the rear collision is predicted and then the headrest front portion is moved. In such a case, since the head of the passenger is less restrained, there has been a demand for more reliably restraining the head of the passenger.

Therefore, it is desirable to predict a possibility of the rear collision even without using a detection unit such as radar detecting the rear vehicle. In a case in which the rear collision is predicted, a backset (a horizontal distance between the headrest and the head of the passenger) between the headrest and the head of the passenger may be set to be small in order to reliably restrain the head of the passenger. On the other hand, when the possibility of the rear collision is predicted to be low, the backset may be set to be large in order for the passenger to feel comfortable.

The invention is made in view of such circumstances, and provides a headrest device capable of predicting the possibility of the rear collision without using the detection unit such as radar and appropriately setting the distance of the backset between the headrest and the head of the passenger in accordance with the prediction result.

In order to address the above-described subject, according to a first aspect of the invention, there is provided a headrest device including: a headrest body which includes a headrest rear portion supported with respect to a seatback of a seat on which a passenger of a vehicle sits, and a headrest front portion that is movable within a predetermined range from a fully closed position that the headrest front portion is provided closest to the headrest rear portion to a fully open position that the headrest front portion is provided farthest from the headrest rear portion; a detection unit which detects a running state or an operation state of the vehicle; a prediction unit which predicts a possibility of a rear vehicle collision with the vehicle on the basis of the running state or the operation state of the vehicle detected by the detection unit; and a control unit which controls the movement of a position of the headrest front portion so that the backset becomes smaller than a backset at the time of the prediction, in a case in which the possibility of the rear vehicle collision is predicted by the prediction unit.

According to the headrest device of the first aspect, the possibility of the rear vehicle collision is determined on the basis of the running state or the operation state of the vehicle, and in a case in which the possibility that the rear vehicle collides with the vehicle is predicted, the movement of the position of the headrest front portion is controlled so that the backset becomes smaller than a backset at the time of the prediction of the rear vehicle collision. According to the first aspect of the invention, the possibility of the rear vehicle collision may be predicted without using the detection unit such as radar detecting the rear vehicle, and the size of the backset may be appropriately set in accordance with the prediction result.

Further, in the headrest device of the first aspect, in a case in which the prediction unit predicts low possibility of the rear vehicle collision, the control unit may control the position of the headrest front portion so that the backset becomes larger than the backset at the time of the prediction of the possibility of the rear vehicle collision.

In the headrest device of the first aspect, the detection unit may detect an accelerator opening degree of the vehicle as the operation state of the vehicle. The prediction unit may predict that there is a possibility of the rear vehicle collision with the vehicle when the accelerator opening degree of the vehicle is a predetermined value or less, and may predict low possibility of the rear vehicle collision in a case in which the accelerator opening degree of the vehicle is larger than the predetermined value.

In the headrest device of the first aspect, the detection unit may detect the speed of the vehicle as the running state of the vehicle. The prediction unit may predict low possibility of the rear vehicle collision in a case in which the speed of the vehicle is maintained within a predetermined range for a predetermined time, and may predict the possibility of the rear vehicle collision in a case in which the speed of the vehicle is outside of the predetermined range or in a case in which the speed of the vehicle is not maintained within the predetermined range for the predetermined time.

According to the headrest device of a second aspect, in the headrest device of the first aspect, the headrest device may further include an angle detection unit which detects an angle of the seatback. An angle of the seatback with respect to the seat may be changeable and in a case in which the prediction unit predicts low possibility of the rear vehicle collision with the vehicle, the control unit may control the position of the headrest front portion so that the backset becomes a predetermined value on the basis of the angle of the seatback detected by the angle detection unit. When the prediction unit predicts the possibility of the rear vehicle collision, the control unit may control the backset to become smaller than the predetermined value and control the headrest front portion to move at a speed faster than a speed at which the headrest front portion moves in a case in which the prediction unit predicts the low possibility of the rear vehicle collision.

In the headrest device of the first and second aspects, the detection unit may detect an operation amount of a brake pedal of the vehicle as the operation state of the vehicle. Then, the prediction unit may predict that there is the possibility of the rear vehicle collision with the vehicle in a case in which the operation amount of the brake pedal is a predetermined operation amount or more, and may predict the low possibility of the rear vehicle collision in a case in which the operation amount of the brake pedal is less than the predetermined operation amount.

In the headrest device of the first and second aspects, in a case in which the prediction unit predicts the possibility of the rear vehicle collision with the vehicle, the control unit may control the headrest front portion to move to the fully open position or to a position at which the headrest front portion contacts the head of the passenger.

As described above, the headrest device of each aspect of the invention is advantageous in that the possibility of the rear collision may be predicted without using the detection unit such as radar and in that the size of the backset may be appropriately set according to the prediction result.

BRIEF DESCRIPTION OF THE DRAWINGS

Embodiments of the present invention will be described in detail based on the following figures, wherein.

DESCRIPTION

Hereinafter, exemplary embodiments in which the invention is applied to a headrest device for a vehicle will be described with reference to the accompanying drawings.

First Exemplary Embodiment

Figure 1:
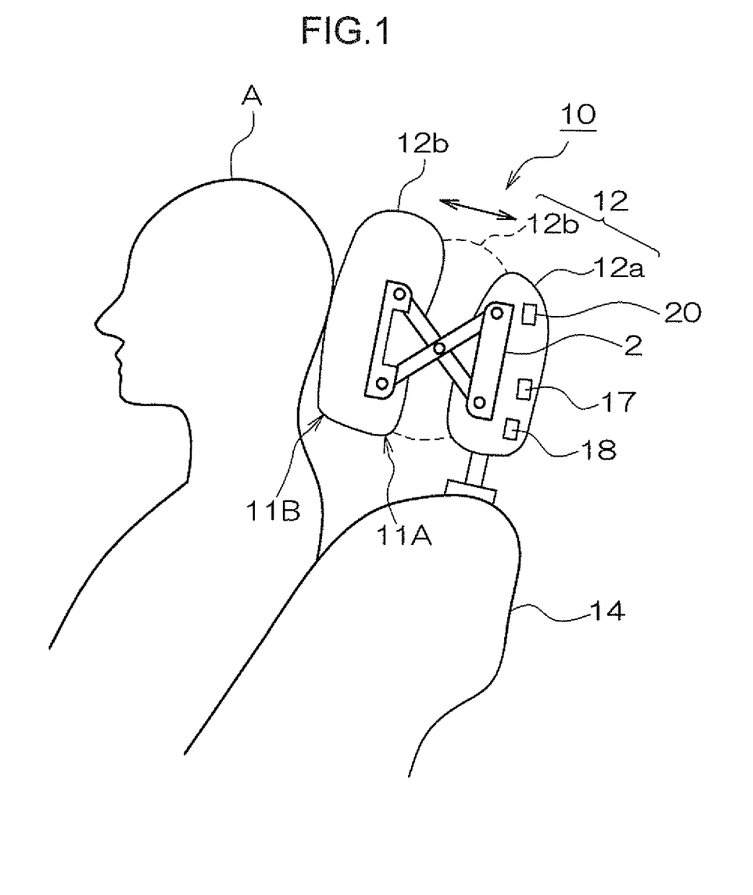
FIG. 1 is a diagram illustrating a headrest device according to a first exemplary embodiment.

A first exemplary embodiment will be described. As shown in FIG. 1, a headrest device 10 of the first exemplary embodiment includes a headrest body 12; a seatback angle sensor 17 which detects an angle of a seatback 14; a headrest position detection sensor 18 which detects a position of a headrest front portion 12b (more specifically, a position of a headrest front portion 12b with respect to a fully closed position 11A); and a headrest control electronic control unit (ECU) 20. Further, the headrest control ECU 20 is connected to an accelerator pedal stroke sensor 16 (refer to FIG. 3) which detects an accelerator opening degree and serves as a detection unit detecting an operation state of a vehicle. The accelerator pedal stroke sensor 16 may be configured as any sensor as long as the sensor is able to detect an accelerator opening degree of the vehicle, and may be provided inside the headrest body 12.

The headrest body 12 includes a headrest rear portion 12a and the headrest front portion 12b. The headrest rear portion 12a is supported at the seatback 14 an angle of which with respect to a seat (not shown) on which the passenger A of the vehicle sits is changeable; and the headrest front portion 12b which is movable within a predetermined range from the fully closed position 11A in which the headrest front portion 12b is set closest to the headrest rear portion 12a to the fully open position 11B in which the headrest front portion 12b is set farthest from the headrest rear portion 12a. Note that, in FIG. 1, the position of the headrest front portion 12b depicted by the broken line indicates the fully closed position 11A, and the position of the headrest front portion 12b depicted by the solid line indicates the fully open position 11B.

Here, the headrest body 12 will be described in more detail. As described above, the headrest body 12 includes: the headrest front portion 12b which is located at the front side of the vehicle; the headrest rear portion 12a which is located at the rear side of the vehicle; and a driving mechanism 2 which is provided inside the headrest body to drive the headrest front portion 12b in the front/rear direction. When the driving mechanism 2 is driven, the headrest front portion 12b is moved in a reciprocating manner in the front/rear direction of the vehicle with respect to the headrest rear portion 12a, and a distance between a head of the passenger A and the headrest front portion 12b is controlled. More specifically, a backset (a size of a backset) which is a distance between the head of the passenger A and the headrest front portion 12b in the horizontal direction is controlled.

Figure 2:
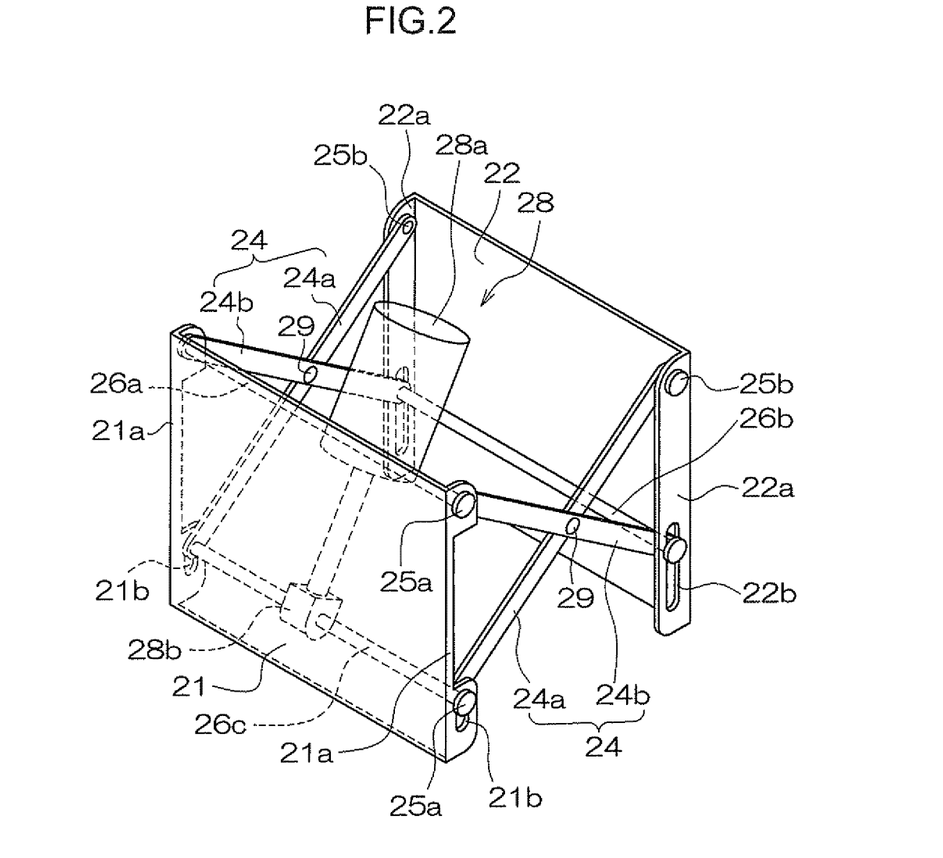
FIG. 2 is a diagram illustrating a driving mechanism according to the first exemplary embodiment.

FIG. 2 is a diagram illustrating an example of a structure of the driving mechanism 2. A pair of front and rear bases 21 and 22 is connected to each other through a pair of left and right X-shaped links 24. The base 21 is coupled to the headrest front portion 12b and the other base 22 is coupled to the headrest rear portion 12. Further, each pair of links 24 includes two link members 24a and 24b, and the substantially center portions of the link members 24a and 24b are rotatably connected to each other through pins 29, respectively. Both end portions of the link members 24a and 24b are respectively connected to side portions 21a and 22a that are integrally formed with the bases 21 and 22 at both sides.

The front end portions of a pair of link members 24a are coupled to each other through a shaft 26c. Both end portions of the shaft 26c are slidably inserted to guide holes 21b that are formed at the side portions 21a of the base 21 to be elongated in the longitudinal direction, and each rear end portion of the link member 24a is rotatably connected to the side portion 22a of the base 22 through a pin 25b.

On the other hand, the front end portions of the pair of links 24b are coupled to each other through a shaft 26a, and the rear end portions thereof are coupled to each other through a shaft 26b. Further, each front end portion of the link 24b is rotatably connected to the side portion 21a of the base 21 through a pin 25a, and both end portions of the shaft 26b are slidably inserted to guide holes 22b that are formed in the side portion 22a of the base 22 to be elongated in the longitudinal direction.

The base 22 at the vehicle front side includes an electric unit 28 which is a driving source of the driving mechanism 2. A motor 28a of the electric unit 28 is attached at an inner side of the base 22. Further, a driving shaft of the motor 28a is connected to the shaft 26c through a ball screw portion 28b. Due to the function of the ball screw portion 28b, the forward/reverse rotation of the motor 28a is converted into an elevation operation of the shaft 26c. Accordingly, on the basis of the driving control of the electric unit 28, both X-shaped links 24 operate like a pantograph, and the base 21 moves relative to the base 22.

Further, the driving mechanism 2 shown in FIG. 2 is an example of a mechanism used for moving the headrest front portion 12b, and any mechanism may be used as long as the mechanism is able to move the headrest front portion 12b relative to the headrest rear portion 12a.

The accelerator pedal stroke sensor 16 detects the accelerator opening degree by detecting an operation amount of the accelerator pedal as an operation state of the vehicle, and outputs a detection signal indicating the detected accelerator opening degree to the headrest control ECU 20.

The seatback angle sensor 17 is used to detect the angle of the seatback 14 with respect to the vertical direction, and outputs a detection signal indicating the detected angle to the headrest control ECU 20. Further, as the seatback angle sensor 17, for example, an acceleration sensor or the like may be used.

The headrest position detection sensor 18 is used to detect the position of the headrest front portion 12b as described above, and outputs a detection signal indicating the detected position to the headrest control ECU 20. As the headrest position detection sensor 18, for example, a potentiometer, a linear sensor, a rotary encoder, or the like may be used.

Figure 3:
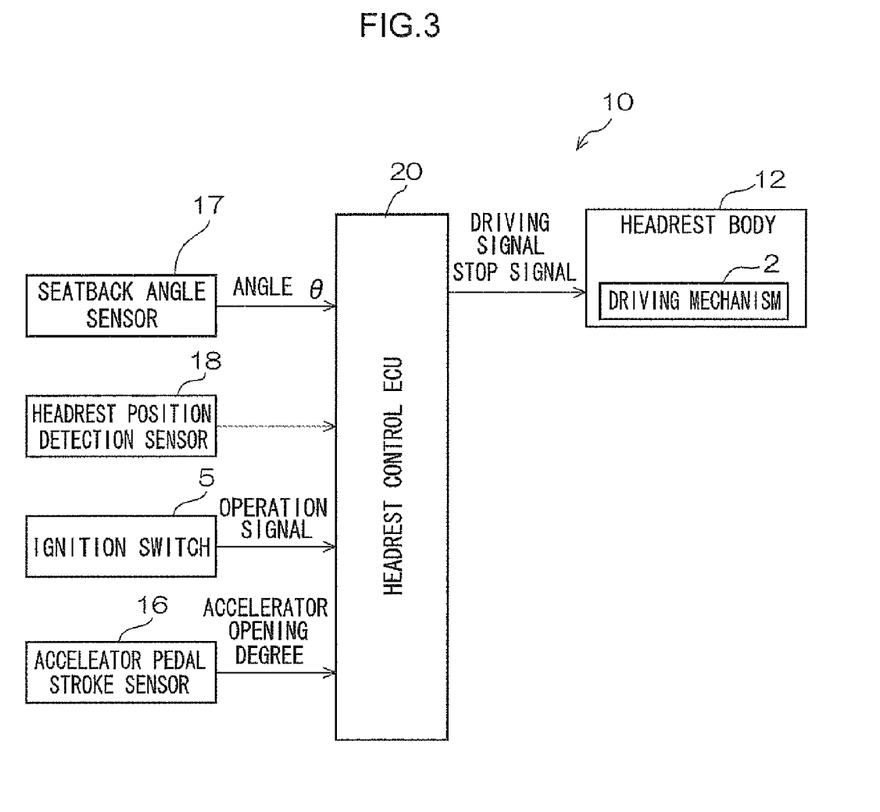
FIG. 3 is a diagram illustrating a headrest device according to the first exemplary embodiment.

As shown in FIG. 3, the headrest control ECU 20 is connected with the accelerator pedal stroke sensor 16, the seatback angle sensor 17, the headrest position detection sensor 18, an ignition switch 5, and the driving mechanism 2 (more specifically, the motor 28a of the driving mechanism 2). The headrest control ECU 20 includes a read only memory (ROM), a central processing unit (CPU), a random access memory (RAM), and an input and output (I/O) port. The ROM, the CPU, the RAM, and the I/O port are connected to one another through a bus.

The ROM as a storage medium (storage unit) stores a basic program such as OS, a program for executing a process routine of a first headrest movement control process to be described below in detail, and a variety of information.

The CPU executes the program which is read from the ROM. The RAM temporarily stores a variety of data.

The I/O port is connected to the accelerator pedal stroke sensor 16, the headrest position detection sensor 18, the ignition switch 5, and the driving mechanism 2 (the motor 28a of the driving mechanism 2). Further, the ignition switch 5 outputs signals indicating ON-state and OFF-state according to actual ON-state and OFF-state.

Figure 4:
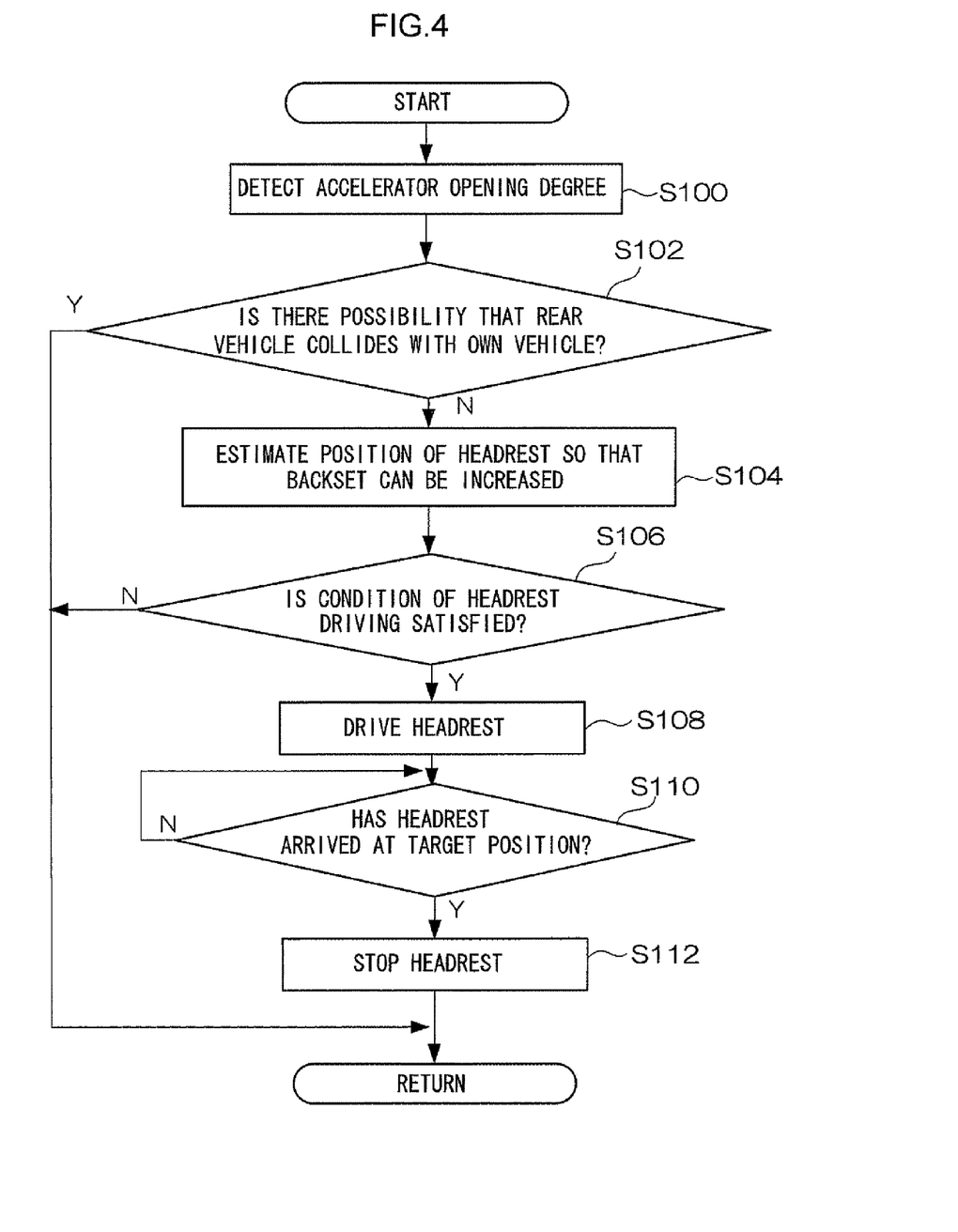
FIG. 4 is a flowchart illustrating a first headrest movement control process that is executed by a CPU of a headrest control ECU.

Next, the process routine of the first headrest movement control process executed by the CPU of the headrest control ECU 20 will be described with reference to FIG. 4. Here, the first control process is executed at a predetermined interval when powers is supplied from a power source (not shown) to the headrest control ECU 20 and while the ignition switch 5 outputs a signal indicating the ON state. Further, when the first control process is started, the position of the headrest front portion 12b is set to an intermediate position between the fully closed position 11A and the fully open position 11B.

First, in step S100, a detection signal is received from the accelerator pedal stroke sensor 16, and the accelerator opening degree is obtained from the detection signal.

In next step S102, it is predicted if there is any possibility that a rear vehicle collides with an own vehicle on the basis of the operation state of the vehicle. More specifically, in step S102, in a case in which the accelerator opening degree detected in step S100 is a predetermined value (for example, 0) or less, it is predicted that there is a possibility that rear vehicle collides with the vehicle. On the other hand, in a case in which the accelerator opening degree is larger than the predetermined value, it is predicted that there is low possibility that the rear vehicle collides with the vehicle. Further, step S102 is an example of a prediction method.

In step S102, when the possibility of the rear vehicle collision is predicted, the first headrest movement control process is finished. On the other hand, in step S102, when the possibility of the rear vehicle collision is predicted to be low, the current process moves to next step S104.

In step S104, the position of the headrest front portion 12b is determined so that the backset increases, and the moving amount from the current position of the headrest front portion 12b to the determined position is estimated. For example, the moving amount is estimated after the length of the backset is determined as a value that a predetermined value α (for example, 8 mm) is added to the current size of the backset. In this case, the moving amount is the predetermined value α. Alternatively, when the current position of the headrest front portion 12b locates within the predetermined value α from the fully closed position 11A, the moving amount may be estimated so that the position of the headrest front portion 12b moves to the fully closed position 11A regardless of the current position of the headrest front portion 12b. Further alternatively, in step S104, the moving amount may be estimated so that the position of the headrest front portion 12b moves to the fully closed position 11A all the times.

In next step S106, it is determined whether a condition is satisfied for controlling the movement of the position of the headrest front portion 12b in order to obtain an optimal size of the backset. As for such determination, for example, in step S106, the angle of the seatback 14 is detected by receiving the detection signal from the seatback angle sensor 17. When the angle of the seatback 14 is less than a first predetermined value (for example, 20°), since the seatback 14 stands too steep, it is determined that the above-described condition is not satisfied. Further, when the angle of the seatback 14 is larger than a second predetermined value (for example, 28°), since the seatback 14 is reclined too much and the current backset may already be enough, the above-described control may not need to be executed, and it is determined that the above-described condition is not satisfied. When the angle of the seatback 14 is the first predetermined value or more and is less than the second predetermined value, it is determined that the above-described condition is satisfied.

Further, in addition to above determination method, various determination methods may be executed in step S106. For example, if it is detected that a variation in the angle of the seatback 14 per a unit time is a third predetermined value β or more on the basis of time series data of the detected angle of the seatback 14, even when the angle of the seatback 14 is in an range of the first predetermined value or more and less than the second predetermined value, it may be determined that the above-described condition is not satisfied. This is because of the following reason. When the passenger A strongly contacts the seatback 14 or the passenger at the rear seat holds the seatback 14 to get on the vehicle, the angle of the seatback 14 temporarily changes to be within the range. In such a case, the actual position of the seatback 14 may be out of the range and the condition for controlling the movement of the position of the headrest front portion 12b is not satisfied. Further, in step S106, if it is detected that a variation in the angle of the seatback 14 per the unit time is less than the third predetermined value β as well as the angle of the seatback 14 is in the range, it may be determined that the above-described condition is satisfied.

In step S106, when it is determined that the above-described condition is satisfied, the current process moves to next step S108. On the other hand, in step S106, when it is determined that the above-described condition is not satisfied, the first headrest movement control process is finished.

In step S108, the movement of the headrest front portion 12b from its current position to the direction of the fully closed position 11A is started. More specifically, the motor 28a is controlled so that the headrest front portion 12b starts to move toward the fully closed position 11A.

In next step S110, a detection signal is received from the headrest position detection sensor 18, and it is determined whether the position indicated by the received detection signal is equal to the position of the headrest front portion 12b set in step S104 to increase the backset.

In step S110, when it is determined that the position indicated by the received detection signal is equal to the position of the headrest front portion 12b set in step S104, the current process moves to next step S112. On the other hand, in step S110, when it is determined that the position indicated by the received detection signal is not equal to the position of the headrest front portion 12b set in step S104, the determination process is executed until it is determined that the positions are equal to each other.

In step S112, the motor 28a is controlled so that the movement of the headrest front portion 12b is stopped. Accordingly, the movement of the headrest front portion 12b is stopped, and the size of the backset becomes an appropriate size. That is, the size of the backset increases. Then, the first headrest movement control process is finished.

As described above, according to the first headrest movement control process, in step S102, in a case in which the possibility of the rear vehicle collision is predicted to be low, the position of the headrest front portion 12b is controlled so that the size of the backset becomes larger than that of the backset in step S102. In a case in which the possibility of the rear vehicle collision is predicted, the position of the headrest front portion 12b is controlled so that the backset decreases. In this manner, according to the present embodiment, the possibility of the rear collision may be predicted without using a detection unit such as radar configured to detect the rear vehicle, and the size of the backset may be appropriately set in accordance with the prediction result.

Second Exemplary Embodiment

Figure 5:
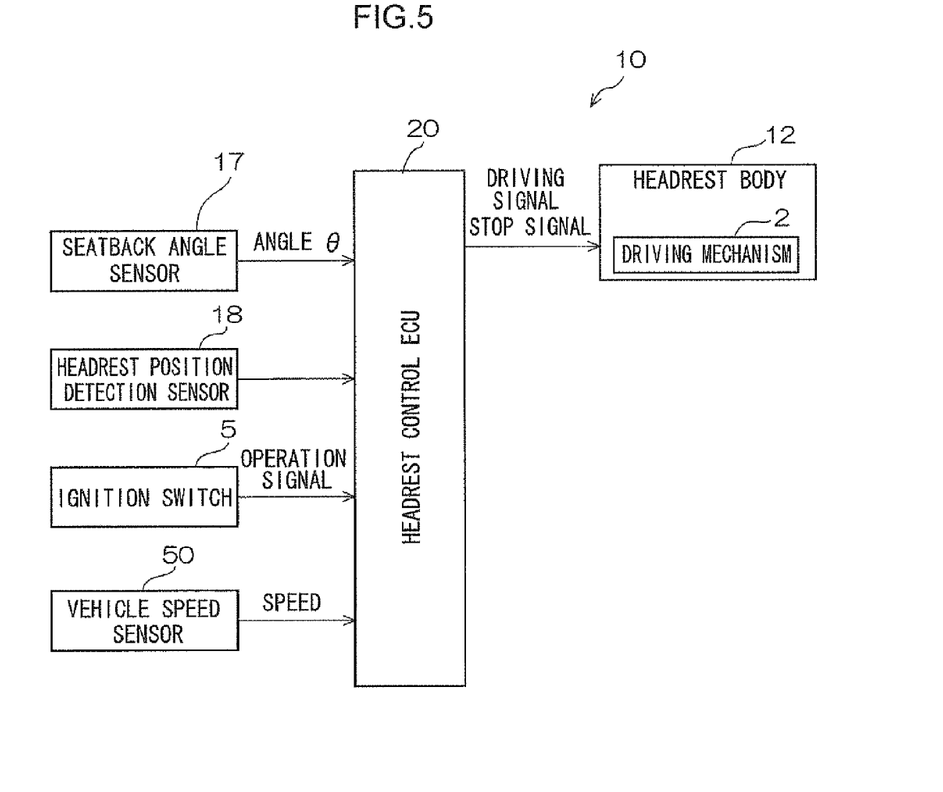
FIG. 5 is a diagram illustrating a headrest device according to a second exemplary embodiment.

Next, a headrest device 10' of a second exemplary embodiment will be described. Like reference numerals are given to like configurations and processes as those of the first exemplary embodiment, and the description thereof will not be repeated.

As shown in FIG. 5, the headrest device 10' of the second exemplary embodiment is different from the headrest device 10 of the first exemplary embodiment in that the headrest device 10' of the present embodiment includes a vehicle speed sensor 50 detecting the speed as a vehicle running state, and the ROM of the headrest control ECU 20 stores a program for executing a process routine of a second headrest movement control process to be described below in detail.

The vehicle speed sensor 50 detects the speed of the running vehicle, and outputs a detection signal indicating the detected speed to the headrest control ECU 20.

Figure 6:
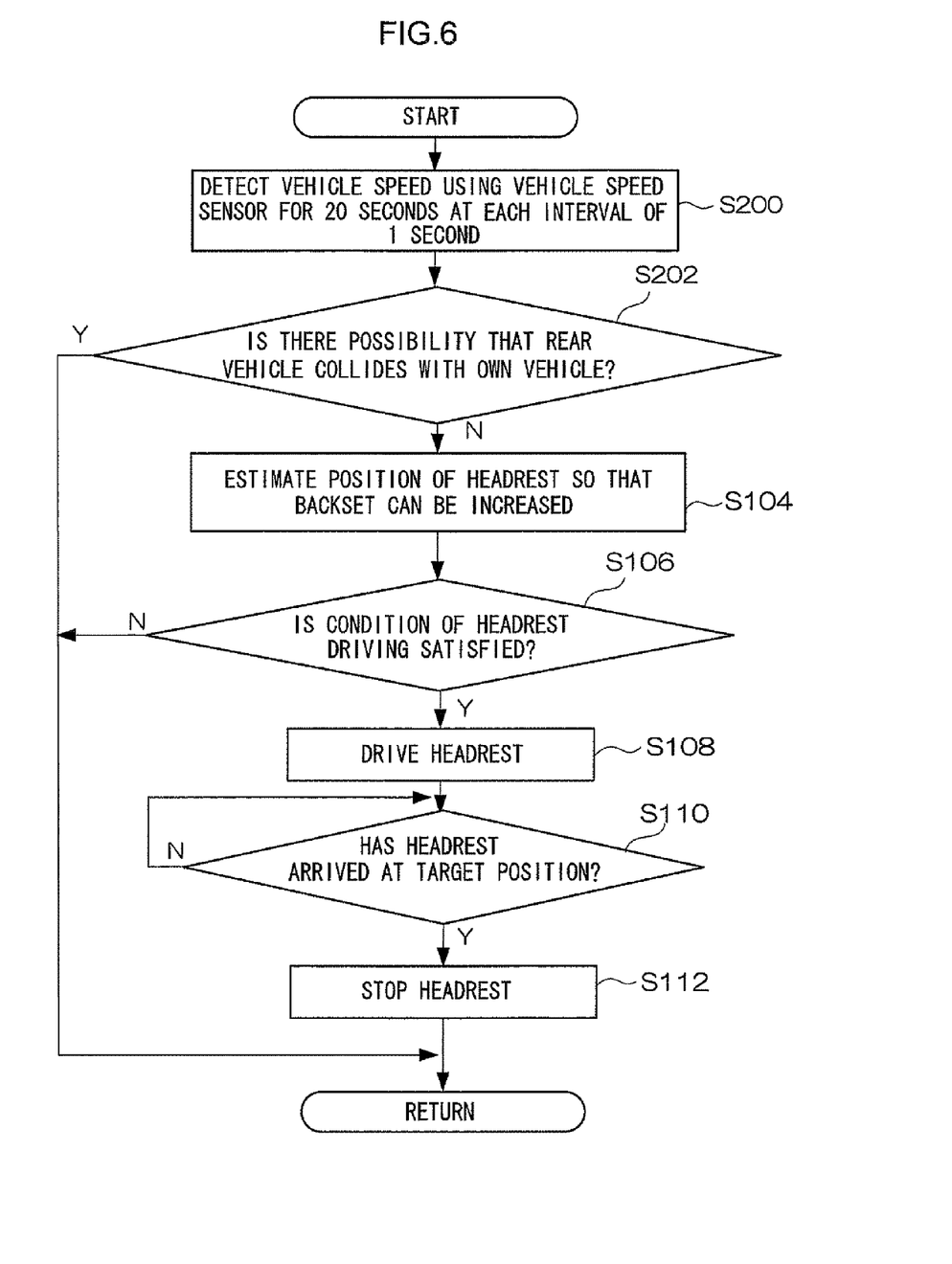
FIG. 6 is a flowchart illustrating a second headrest movement control process that is executed by a CPU of a headrest control ECU.

Next, the process routine of the second headrest movement control process executed by the CPU of the headrest control ECU 20 will be described by referring to FIG. 6. Here, the second control process is executed at a predetermined interval when powers is supplied from a power source (not shown) to the headrest control ECU 2 and while the ignition switch 5 outputs a signal indicating the ON-state. Further, when the second control process is started, the position of the headrest front portion 12b is set to an intermediate position between the fully closed position 11A and the fully open position 11B.

First, in step S200, a detection signal is received from the vehicle speed sensor 50 for a predetermined time (for example, 20 seconds) at an each interval of 1 second, and the vehicle speed indicated by each detection signal is obtained. Accordingly, in step S200, the vehicle speed is detected for a predetermined time at the interval of 1 second.

In next step S202, it is predicted if there is a possibility that the rear vehicle collides with the own vehicle on the basis of the running state of the vehicle. More specifically, in step S202, in a case in which the vehicle speed detected in step S200 is maintained within a predetermined range (for example, the range of from 80 km/h to 100 km/h) for the predetermined time, it is predicted that there is low possibility that the rear vehicle collides with the vehicle. In a case in which it is detected that the vehicle speed is out of the predetermined range or is not maintained within the predetermined range for the predetermined time, it is predicted that there is a possibility that the rear vehicle collides with the vehicle. Further, step S202 is an example of a prediction method.

In step S202, when the possibility of the rear vehicle collision is predicted, the second headrest movement control process is finished. On the other hand, when the possibility of the rear vehicle collision is predicted to be low, the current process moves to next step S104. Hereinafter, the same process as that of the first exemplary embodiment is executed, and the second control process is finished.

As described above, according to the second headrest movement control process, in step S202, in a case in which low possibility of the rear vehicle collision is predicted, the position of the headrest front portion 12b is controlled so that the size of the backset becomes larger than that of the backset in step S202. In a case in which it is predicted that there is the possibility of the rear vehicle collision, the position of the headrest front portion 12b is controlled so that the backset decreases. In this manner, according to the present embodiment, the possibility of the rear collision may be predicted without using a detection unit such as radar configured to detect the rear vehicle, and the size of the backset may be appropriately set in accordance with the prediction result.

Third Exemplary Embodiment

Next, a headrest device 11 of a third exemplary embodiment will be described. Like reference numerals are given to like configurations and processes as those of the first and second exemplary embodiments, and the description thereof will not be repeated.

Figure 7:
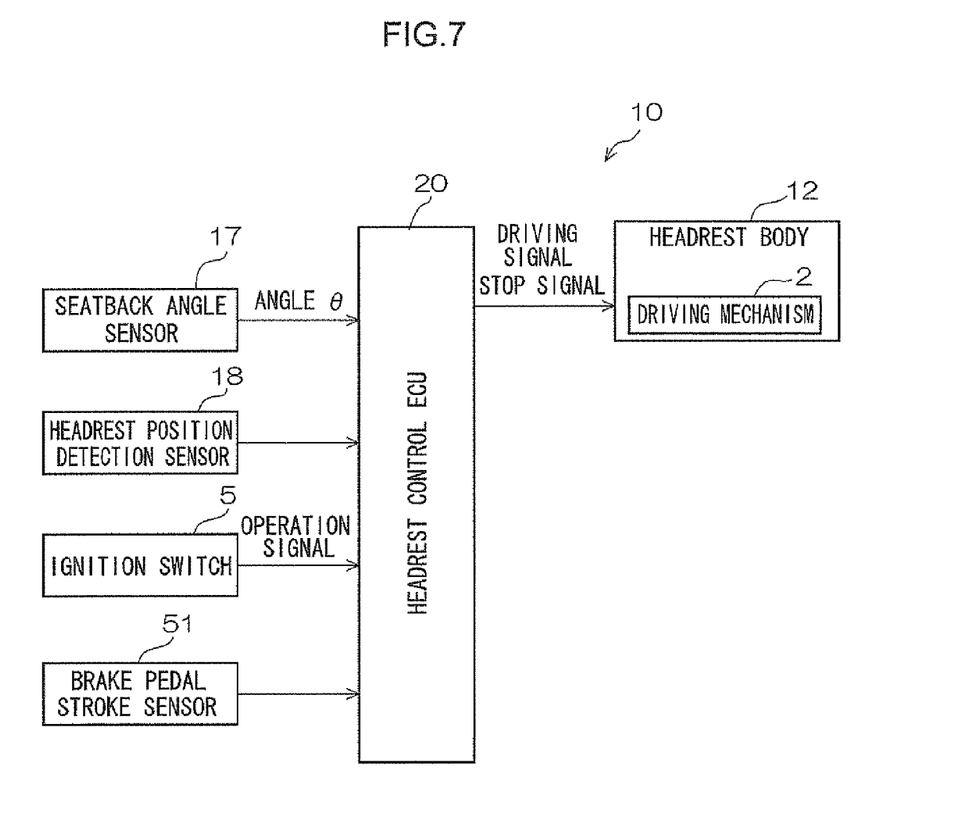
FIG. 7 is a diagram illustrating a headrest device according to a third exemplary embodiment.

As shown in FIG. 7, the headrest device 11 of the third exemplary embodiment is different from the headrest device 10 of the first exemplary embodiment and the headrest device 10' of the second exemplary embodiment in that the headrest device 11 of the present embodiment includes a brake pedal stroke sensor 51 detecting an operation amount of the brake pedal of the vehicle as an operation state of the vehicle. Additionally, the ROM of the headrest control ECU 20 includes a program for executing a process routine of a third headrest movement control process to be described below in detail and information of "positions based on the fully closed position 11A of the headrest front portion 12b corresponding to each angle of the seatback 14".

Figure 8A:
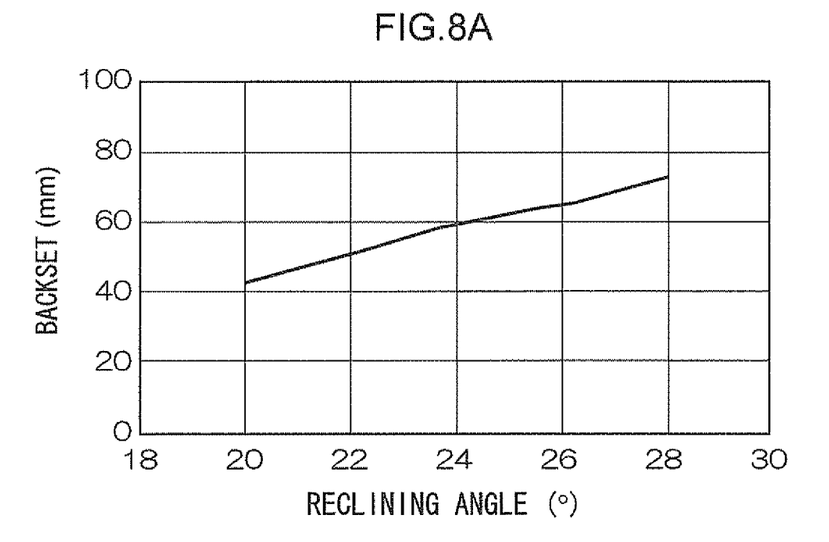
FIGS. 8A and 8B are diagrams illustrating an example of a backset that changes according to an angle of a seatback.
Figure 8B:
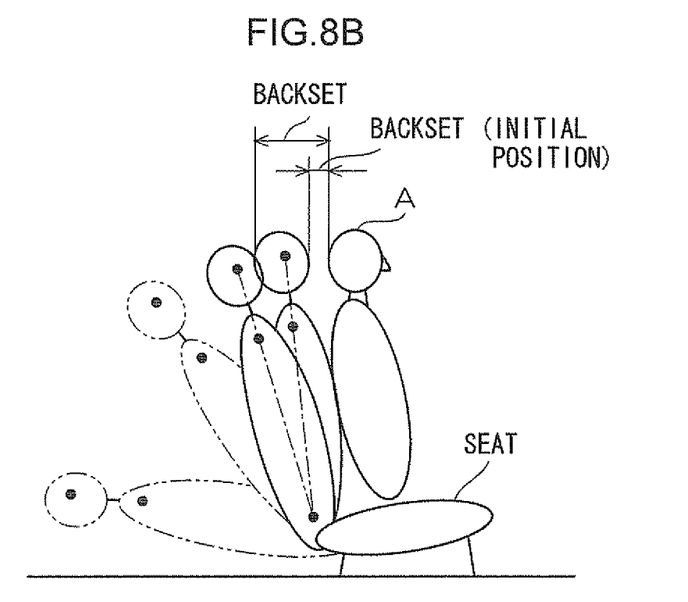
Figure 9A:
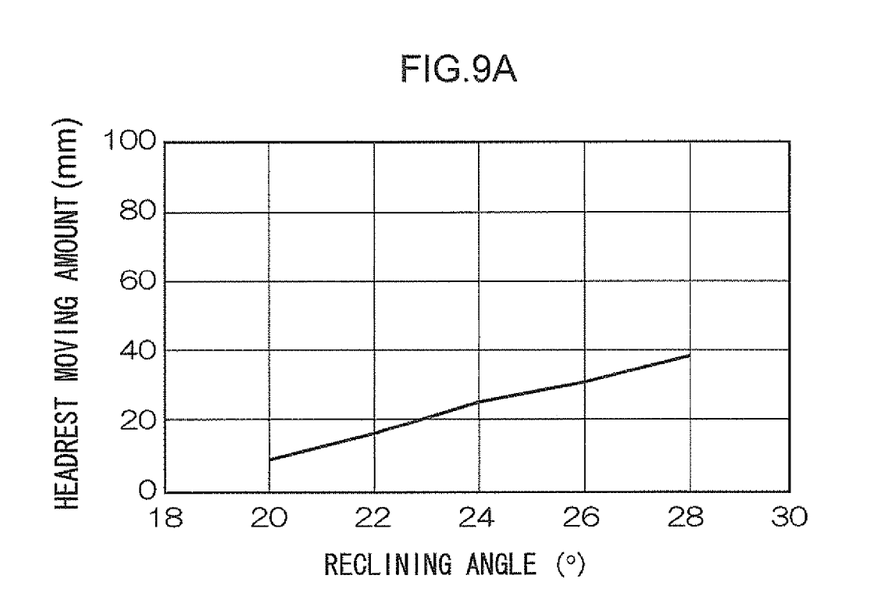
FIGS. 9A and 9B are diagrams illustrating a moving amount in accordance with the angle of the seatback.
Figure 9B:
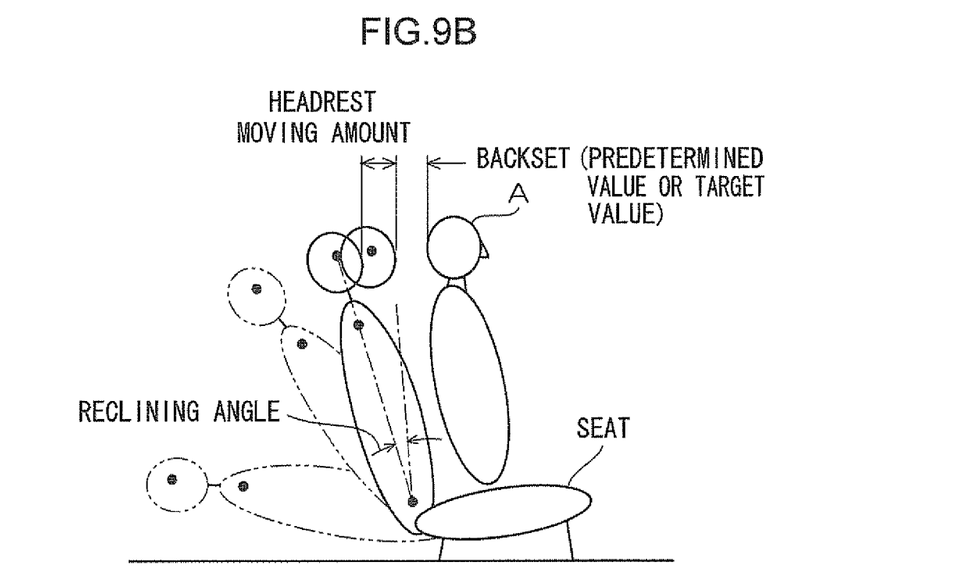
Figure 10:
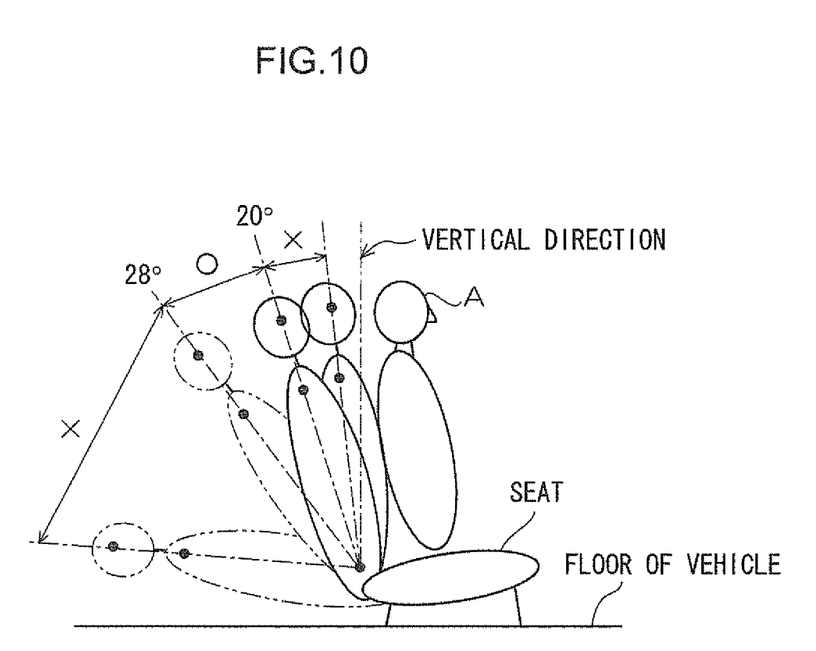
FIG. 10 is a diagram illustrating a condition in which a movement control of the seatback is executed.

Here, FIGS. 8A and 8B illustrate an example of a relationship between the angle (which is a so-called reclining angle, and in the present embodiment, an angle of the seatback 14 with respect to the vertical direction) of the seatback 14 and the size of the backset. As shown in FIGS. 8A and 8B, as the angle of the seatback 14 changes, the size of the backset changes. Therefore, in the present embodiment, the ROM stores the movement amounts (operation amount) of the headrest front portion 12b which are vary in accordance with the angle of the seatback 14 so that the backset is maintained at an appropriate size (a predetermined value or a target value) even when the angle of the seatback 14 changes. That is, the ROM stores the movement amount of the headrest front portion 12b corresponding to each angle of the seatback 14. The movement amount includes information indicating the position of the headrest front portion 12b in a case in which the fully closed position 11A is set to a reference position (0). Here, FIGS. 9A and 9B illustrate an example of the movement amount thereof. FIGS. 9A and 913 illustrate an example of the movement amount corresponding to each angle of the seatback 14 when the appropriate size (the predetermined value or the target value) of the backset is set to 35 mm. Here, the movement amount indicates the movement amount of the headrest front portion 12b from the fully closed position 11A toward the fully open position 11B. In other word, the information indicates the position of the headrest front portion 12b based on the fully closed position 11A. Further, in the present embodiment, when the seatback 14 stands up too steep, for example, when the angle of the seatback 14 is less than 20° as indicated in FIG. 10, or the seatback 14 is reclined too much, for example, when the angle of the seatback 14 is larger than 28° in FIG. 10, the control of maintaining the headrest front portion 12b at a predetermined value is not executed. For this reason, the movement amount for each of such cases is not stored in the ROM. Accordingly, the resource of the ROM as the storage unit may be effectively used. When the seatback 14 stands up too steep, the headrest front portion 12b at a control start timing locates close to a position having the appropriate size of the backset and the passenger's head, and therefore, the control of the headrest front portion 12b is not performed. When the seatback 14 is reclined too much, the position of the headrest front portion 12b can not be moved so as to become the appropriate size of the backset, and therefore, the control of the headrest front portion 12b is also not performed.

The brake pedal stroke sensor 51 detects the operation amount of the brake pedal of the vehicle as the operation state of the vehicle, and outputs a detection signal indicating the detected operation amount of the brake pedal to the headrest control ECU 20.

Figure 11:
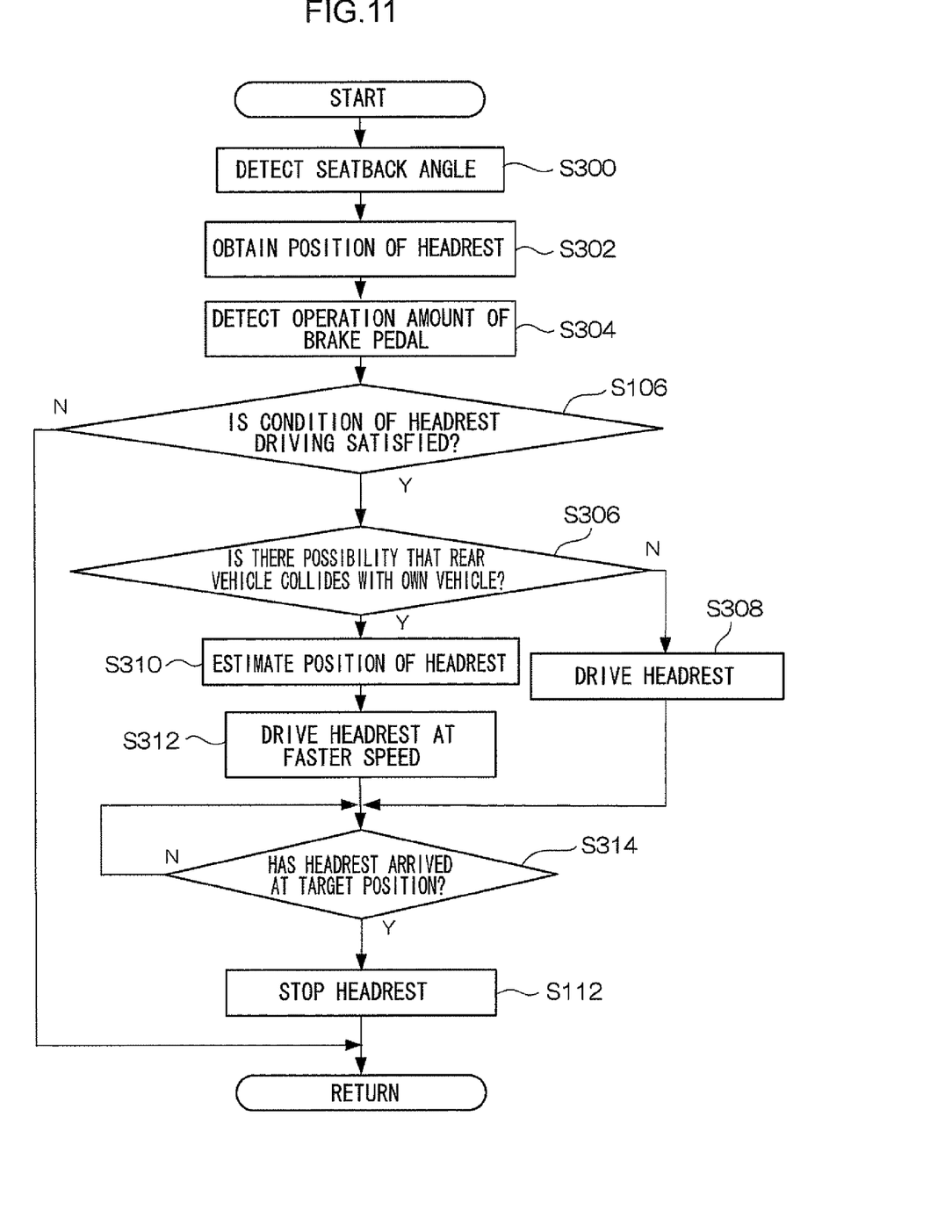
FIG. 11 is a flowchart illustrating a third headrest movement control process that is executed by the CPU of the headrest control ECU.

Next, a process routine of a third headrest movement control process executed by the CPU of the headrest control ECU 20 will be described by referring to FIG. 11. Here, the third control process is executed at a predetermined interval when powers is supplied from a power source (not shown) to the headrest control ECU 20 and while the ignition switch 5 outputs a signal indicating the ON-state. When the third control process is started, the position of the headrest front portion 12b is set to an intermediate position between the fully closed position 11A and the fully open position 11B.

First, in step S300, a detection signal is received from the seatback angle sensor 17, and the angle of the seatback 14 is detected.

In next step S302, the position of the headrest front portion 12b corresponding to the angle of the seatback 14 detected in step S300 is obtained from information of "the position based on the fully closed position 11A of the headrest front portion 12b corresponding to each angle of the seatback 14" stored in the ROM.

In next step S304, a detection signal is received from the brake pedal stroke sensor 51, and the operation amount of the brake pedal of the vehicle is detected as the operation state of the vehicle.

In next step S106, as in the first and second exemplary embodiments, it is determined whether a condition is satisfied for controlling the movement of the position of the headrest front portion 12b in order to obtain the optimal size of the backset.

In step S106, when it is determined that the above-described condition is satisfied, the current process moves to next step S306. On the other hand, in step S106, when it is determined that the above-described condition is not satisfied, the third control process is finished.

In step S306, it is predicted if there is a possibility of the rear vehicle collision with the own vehicle on the basis of the operation state of the vehicle. More specifically, in step S306, in a case in which the operation amount of the brake pedal detected in step S304 is a predetermined value (for example, 5 cm) or more, it is predicted that there is a possibility of the rear vehicle collision. On the other hand, in a case in which the operation amount of the brake pedal is less than the predetermined value, it is predicted that there is low possibility of the rear vehicle collision. Further, step S306 is an example of a prediction method.

In step S306, when the possibility of the rear vehicle collision is predicted to be low, the current process moves to next step S308. In step S308, the movement of the headrest front portion 12b is started so that the position of the headrest front portion 12b is equal to the position obtained in step S302. More specifically, the movement of the headrest front portion 12b is started by means of the motor 28a so that the position of the headrest front portion 12b becomes equal to the position obtained in step S302. At this time, the motor 28a is controlled such that the movement speed of the headrest front portion 12b is equal to a first movement speed F (mm/s). Then, the current process moves to step S314.

On the other hand, in step S306, when a possibility of the rear vehicle collision is predicted, the current process moves to next step S310. In step S310, the position is estimated at which the backset becomes smaller than that of the position obtained in step S302. In next step S312, the movement of the headrest front portion 12b is started so that the position of the headrest front portion 12b is equal to the position estimated in step S310. More specifically, the movement of the headrest front portion 12b is started by means of the motor 28a so that the position of the headrest front portion 12b becomes equal to the position estimated in step S310. At this time, the motor 28a is controlled such that the movement speed of the headrest front portion 12b is equal to a second speed F' (mm/s) faster than the first speed F (mm/s). Then, the current process moves to step S314.

In step S314, a detection signal is received from the headrest position detection sensor 18, and it is determined whether the position indicated by the received detection signal is equal to the position of the headrest front portion 12b obtained in step S302 or estimated in step S310.

In step S314, when it is determined that the position indicated by the received detection signal is equal to the position of the headrest front portion 12b obtained in step S302 or estimated in step S310, the current process moves to next step S112. On the other hand, in step S314, when it is determined that the position indicated by the received detection signal is not equal to the position of the headrest front portion 12b in step S302 or S310, the determination process is executed until it is determined that the positions are equal to each other.

In step S112, the motor 28a is controlled so that the movement of the headrest front portion 12b is stopped, and the size of the backset becomes an appropriate size. Then, the third headrest movement control process is finished.

As described above, according to the third headrest movement control process, in step S306, in a case in which it is predicted that there is low possibility of the rear vehicle collision with the vehicle, the position of the headrest front portion 12b is controlled so that the backset becomes a predetermined value on the basis of the angle of the seatback 14 detected in step S300. On the other hand, in step S306, in a case in which it is predicted that there is a possibility of the rear vehicle collision, the backset is controlled to be smaller than the predetermined value. In this case, the movement of the headrest front portion 12b is controlled at the faster speed F' (mm/s) than the speed F (mm/s) when the rear vehicle collision is not predicted. In this manner, according to the present embodiment, the possibility of the rear collision may be predicted without using a detection unit such as radar configured to detect the rear vehicle, and the size of the backset may be appropriately set in accordance with the prediction result.

Further, when the possibility of the rear vehicle collision is predicted in step S306, in step S310, the fully open position 11B may be selected as the position in which the backset becomes smaller than that of the position obtained in step 302. Further, a pressure sensor may be provided inside the headrest front portion 12b. Then, in step S310, the movement of the headrest front portion 12b is started toward the fully open position 11B, and in step S312, it is determined whether the pressure sensor contacts the head of the passenger A and a pressure value indicated by a signal output from the pressure sensor is a predetermined value or more. In the case of the affirmative determination (when it is determined that the pressure is a predetermined value or more), it is determined that the pressure sensor contacts the head of the passenger, and the current process moves to step S314. In the case of the negative determination, the determination process may be executed until the determination result becomes affirmative.

In addition, in the above-described exemplary embodiments, an example has been described in which the appropriate size (the predetermined value) of the backset is 35 mm, but the appropriate size of the backset is not limited thereto. For example, various values such as 32 mm and 37 mm may be employed.

Furthermore, in the above-described exemplary embodiments, an example has been described in which the angle of the seatback 14 with respect to the vertical direction or the angle of a floor of the vehicle with respect to the vertical direction is detected, but the invention is not limited thereto. For example, the angle of the seatback 14 or the floor of the vehicle with respect to a predetermined direction (for example, the horizontal direction) may be detected.

Moreover, the arrangement positions of the seatback angle sensor 17, the headrest position detection sensor 18, and the headrest control ECU 20 are not limited to the positions shown in the drawings.

What is claimed is:

1. A headrest device comprising:
a headrest body which includes a headrest rear portion supported with respect to a seatback of a seat on which a passenger of a vehicle sits, and a headrest front portion configured to move within a predetermined range from a fully closed position closest to the headrest rear portion to a fully open position farthest from the headrest rear portion;
a detection unit configured to detect a running state or an operation state of the vehicle;
a prediction unit configured to predict a possibility of a rear vehicle collision with the vehicle on the basis of the running state or the operation state of the vehicle detected by the detection unit;
a control unit configured to control a movement of a position of the headrest front portion such that a backset becomes smaller than a backset at the time of the prediction if the possibility of the rear vehicle collision is predicted by the prediction unit, the backset being a horizontal distance between the headrest front portion and a head of the vehicle passenger; and
an angle detection unit configured to detect an angle of the seatback, wherein
an angle of the seatback is configured to change with respect to the seat such that if:
(1) the prediction unit predicts a low possibility of the rear vehicle collision with the vehicle, the control unit controls the position of the headrest front portion to move at a first speed such that the backset becomes a predetermined value on the basis of the angle of the seatback detected by the angle detection unit, and
(2) the prediction unit predicts a high possibility of the rear vehicle collision with the vehicle, the control unit controls the backset to become smaller than the predetermined value, and controls the headrest front portion to move at a second speed faster than the first speed.

2. The headrest device according to claim 1, wherein
if the prediction unit predicts a low possibility of the rear vehicle collision with the vehicle, the control unit controls the position of the headrest front portion such that the backset becomes larger than the backset at the time of the prediction of the possibility of the rear vehicle collision.

3. The headrest device according to claim 1, wherein
the detection unit is configured to detect an accelerator opening degree of the vehicle as the operation state of the vehicle, and
the prediction unit predicts a high possibility of the rear vehicle collision with the vehicle if the accelerator opening degree of the vehicle is a predetermined value or less, and predicts a low possibility of the rear vehicle collision with the vehicle if the accelerator opening degree of the vehicle is larger than the predetermined value.

4. The headrest device according to claim 1, wherein
the detection unit is configured to detect a speed of the vehicle as the running state of the vehicle, and
the prediction unit predicts a low possibility of the rear vehicle collision with the vehicle if the speed of the vehicle is maintained within a predetermined range for a predetermined time, and predicts a high possibility of the rear vehicle collision with the vehicle if the speed of the vehicle is outside of the predetermined range or if the speed of the vehicle is not maintained within the predetermined range for the predetermined time.

5. The headrest device according to claim 1, wherein
the detection unit is configured to detect an operation amount of a brake pedal of the vehicle as the operation state of the vehicle, and
the prediction unit predicts a high possibility of the rear vehicle collision with the vehicle if the operation amount of the brake pedal is a predetermined operation amount or more, and predicts a low possibility of the rear vehicle collision with the vehicle if the operation amount of the brake pedal is less than the predetermined operation amount.

6. The headrest device according to claim 1, wherein if the prediction unit predicts the possibility of the rear vehicle collision with the vehicle, the control unit controls the headrest front portion to move to the fully open position or to a position at which the headrest front portion contacts the head of the passenger.

7. The headrest device according to claim 5, wherein if the prediction unit predicts the possibility of the rear vehicle collision with the vehicle, the control unit controls the headrest front portion to move to the fully open position or to a position at which the headrest front portion contacts the head of the passenger.

* * * * *